(12) United States Patent
Chu

(10) Patent No.: US 11,718,739 B2
(45) Date of Patent: Aug. 8, 2023

(54) THERMOPLASTIC RESIN COMPOSITION AND MOLDED ARTICLE PRODUCED THEREFROM

(71) Applicant: LOTTE CHEMICAL CORPORATION, Seoul (KR)

(72) Inventor: Dong Hui Chu, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 205 days.

(21) Appl. No.: 17/043,035

(22) PCT Filed: Mar. 5, 2019

(86) PCT No.: PCT/KR2019/002541
§ 371 (c)(1),
(2) Date: Sep. 29, 2020

(87) PCT Pub. No.: WO2019/190068
PCT Pub. Date: Oct. 3, 2019

(65) Prior Publication Data
US 2021/0032451 A1 Feb. 4, 2021

(30) Foreign Application Priority Data
Mar. 30, 2018 (KR) ........................ 10-2018-0037016

(51) Int. Cl.
*C08L 23/12* (2006.01)
*C08K 3/22* (2006.01)
*C08L 23/16* (2006.01)

(52) U.S. Cl.
CPC ............ *C08L 23/12* (2013.01); *C08K 3/22* (2013.01); *C08L 23/16* (2013.01); *C08K 2003/2296* (2013.01); *C08K 2201/005* (2013.01); *C08K 2201/006* (2013.01); *C08L 2203/02* (2013.01)

(58) Field of Classification Search
CPC ...... C08L 23/12; C08L 23/16; C08L 2203/02; C08K 3/22; C08K 2003/2296; C08K 2201/005; C08K 2201/006
See application file for complete search history.

(56) References Cited

U.S. PATENT DOCUMENTS

| 3,649,591 A | 3/1972 | Murray et al. |
| 5,714,545 A * | 2/1998 | Lee .................. C08L 23/16 525/193 |
| 9,240,260 B2 | 1/2016 | Hatanaka et al. |
| 10,233,317 B2 | 3/2019 | Kabeya et al. |
| 10,472,490 B2 * | 11/2019 | Yang .................. C08K 5/0016 |
| 10,544,278 B2 * | 1/2020 | Bae .................. C08K 3/22 |
| 2005/0043485 A1 | 2/2005 | Lee et al. |
| 2005/0048010 A1 * | 3/2005 | Kliss .................. C09C 1/043 424/59 |
| 2009/0170735 A1 | 7/2009 | Park et al. |
| 2012/0329920 A1 | 12/2012 | Sato et al. |
| 2014/0187662 A1 | 7/2014 | Lee et al. |
| 2015/0322252 A1 | 11/2015 | Arechederra |
| 2017/0275448 A1 | 9/2017 | Kim et al. |
| 2018/0016419 A1 | 1/2018 | Shimizu et al. |
| 2018/0112056 A1 * | 4/2018 | Yang .................. C08F 8/42 |
| 2018/0118914 A1 * | 5/2018 | Bae .................. C08K 3/22 |
| 2018/0265683 A1 | 9/2018 | Shimizu et al. |
| 2021/0340366 A1 * | 11/2021 | Park .................. C08K 5/5205 |

FOREIGN PATENT DOCUMENTS

| CN | 101469104 A | 7/2009 |
| CN | 103911000 A | 7/2014 |
| CN | 106188784 A | 12/2016 |
| CN | 106279897 A | 1/2017 |
| CN | 107075236 A | 8/2017 |
| CN | 107108984 A | 8/2017 |
| CN | 107207806 A | 9/2017 |
| CN | 107974030 A | 5/2018 |
| CN | 108003492 A | 5/2018 |
| CN | 108948530 A | 12/2018 |
| EP | 3315546 A1 | 5/2018 |
| JP | 54-004946 A | 1/1979 |
| JP | 10-231429 A | 9/1998 |
| JP | 11-263705 A | 9/1999 |
| JP | 2005-068430 A | 3/2005 |
| JP | 2006-129902 A | 5/2006 |
| JP | 2016-501963 A | 1/2016 |
| JP | 2018-070881 A | 5/2018 |

(Continued)

OTHER PUBLICATIONS

E. N. Kresge, "Polyolefin Thermoplastic Elastomer Blends," 64 Rubber Chemistry and Technology 469-79 (1990) (Year: 1990).*
ZnO-Series Product Description from Hanil Chemical, www.hanzinc.com/new/eng/business/product/ product01.asp, accessed on Aug. 17, 2022, 3-page website printout (2022) (Year: 2022).*
International Search Report in counterpart International Application No. PCT/KR2019/002541 dated Jun. 13, 2019, pp. 1-6.
Mjayaraghavan, Rajagopalan etc., "Insight into the Mechanism of Antibacterial Activity of ZnO: Surface Defects Mediated Reactive Oxygen Species Even in the Dark", Langmuir, 2015, vol. 31, No. 33, pp. 9155-9162.
Search Report in counterpart European Application No. 19777697.4 dated Nov. 29, 2021, pp. 1-4.
Office Action in commonly owned Chinese Application No. 201980076022.7 dated Oct. 14, 2022, pp. 1-8.

(Continued)

*Primary Examiner* — Angela C Scott
(74) *Attorney, Agent, or Firm* — Additon, Pendleton & Witherspoon, P.A.

(57) ABSTRACT

A thermoplastic resin composition of the present invention comprises: polypropylene resin; polyolefin copolymer resin; and zinc oxide, wherein the zinc oxide has an average particle size of about 0.5 to about 3 μm, a specific surface area BET of about 1 to about 10 m²/g, a 2θ peak position in the range of 35° to 37° in X-ray diffraction (XRD) analysis, and a crystallite size value calculated by formula 1 in the range of about 1,000 to about 2,000 Å. The thermoplastic resin composition has excellent antibacterial properties, impact resistance, chemical resistance, weather resistance, fluidity, etc.

8 Claims, No Drawings

(56) References Cited

FOREIGN PATENT DOCUMENTS

| | | |
|---|---|---|
| JP | 2018-070884 A | 5/2018 |
| KR | 10-0696385 B1 | 3/2007 |
| KR | 10-2008-0093788 A | 10/2008 |
| KR | 10-0988999 B1 | 10/2010 |
| KR | 10-2012-0116160 A | 10/2012 |
| KR | 10-2014-0087663 A | 7/2014 |
| KR | 10-2015-0068866 A | 6/2015 |
| KR | 10-2017-0115486 A | 10/2017 |
| KR | 10-2018-0113040 A | 10/2018 |
| WO | 2019/190068 A1 | 10/2019 |
| WO | 2020/130435 A1 | 6/2020 |

OTHER PUBLICATIONS

Extended Search Report in commonly owned European Application No. 19898820.6 dated Jul. 20, 2022, pp. 1-4.
Office Action in counterpart Chinese Application No. 201980032214.8 dated Sep. 2, 2022, pp. 1-6.
Office Action in counterpart Japanese Application No. 2020-552285 dated Nov. 1, 2022, pp. 1-2.
International Search Report in commonly owned International Application No. PCT/KR2019/017109 dated Mar. 20, 2020, pp. 1-6.
Derwent Abstract of 3649591 showing equivalent of JP 47009247 (Acc. No. 1972-23941T, 2 pages).
CAPlus Abstract of JP 54004946 79, 1 page).
Machine translation of JP 54004946 (2022, 2 pages).
Non-Final Office Action in commonly owned U.S. Appl. No. 17/281,017 dated Sep. 22, 2022, pp. 1-8.
Human translation of JP 54004946 (2022, 10 pages).
Notice of Allowance in commonly owned U.S. Appl. No. 17/281,017 dated Jan. 25, 2023, pp. 1-10.

\* cited by examiner

THERMOPLASTIC RESIN COMPOSITION AND MOLDED ARTICLE PRODUCED THEREFROM

CROSS-REFERENCE TO RELATED APPLICATIONS

This application claims priority to and the benefit of International Application No. PCT/KR2019/002541, filed Mar. 5, 2019, which published as WO 2019/190068 on Oct. 3, 2019, and Korean Patent Application No. 10-2018-0037016, filed in the Korean Intellectual Property Office on Mar. 30, 2018, the entire disclosure of each of which is incorporated herein by reference.

TECHNICAL FIELD

The present invention relates to a thermoplastic resin composition and a molded article produced using the same. More particularly, the present invention relates to a thermoplastic resin composition, which has antibacterial properties, impact resistance, chemical resistance, weather resistance, and fluidity, and a molded article produced using the same.

BACKGROUND ART

Recently, with increasing interest in personal health and hygiene and increasing income level, there is increasing demand for thermoplastic resin products having antibacterial and hygienic functions. Accordingly, there is increasing demand for thermoplastic resin products subjected to antibacterial treatment to remove or inhibit bacterial growth on surfaces of household goods and electronic products. Therefore, development of a functional antibacterial material having stability and reliability (an antibacterial thermoplastic resin composition) is a very important challenge.

Such an antibacterial thermoplastic resin composition requires an antibacterial agent. The antibacterial agent can be classified into an organic antibacterial agent and an inorganic antibacterial agent.

Despite advantages of relative inexpensiveness and good antibacterial effects with a small amount of the organic antibacterial agent, the organic antibacterial agent is sometimes toxic to the human body and can be effective against certain bacteria, and there is a concern that the antibacterial effects of the organic antibacterial agent can be lost through decomposition upon processing at high temperature. Moreover, the organic antibacterial agent can cause discoloration after processing and has short antibacterial persistence due to elution thereof. Thus, the range of antibacterial agents applicable to the antibacterial thermoplastic resin composition is very limited.

The inorganic antimicrobial agent contains metal components, such as silver (Ag) and copper (Cu), and exhibits good thermal stability to be frequently used in preparation of the antibacterial thermoplastic resin composition. However, the inorganic antimicrobial agent must be added in an excess amount due to insufficient antibacterial properties, as compared with organic antibacterial agents, and the use of the inorganic antimicrobial agent is very restricted due to disadvantages, such as relatively high price, a problem of uniform distribution upon processing, discoloration due to metallic components, and the like.

Particularly, in order for the antibacterial thermoplastic resin composition to be used in bathroom products, such as toilet seats and the like, products formed of the antibacterial thermoplastic resin composition are required to have sufficient impact resistance and chemical resistance such that a user can sit on the products.

Therefore, there is a need for development of a thermoplastic resin composition having good properties in terms of antibacterial properties, impact resistance, chemical resistance, weather resistance (discoloration resistance), fluidity, and the like.

The background technique of the present invention is disclosed in Korean Patent Registration No. 10-0696385 and the like.

DISCLOSURE

Technical Problem

It is one aspect of the present invention is to provide a thermoplastic resin composition which has good properties in terms of antibacterial properties, impact resistance, chemical resistance, weather resistance, fluidity, and the like.

It is another aspect of the present invention to provide a molded article formed of the thermoplastic resin composition set forth above.

The above and other aspects of the present invention will become apparent from the detailed description of the following embodiments.

Technical Solution

1. One aspect of the present invention relates to a thermoplastic resin composition. The thermoplastic resin composition includes: a polypropylene resin; a polyolefin copolymer resin; and zinc oxide, wherein the zinc oxide has an average particle diameter of about 0.5 μm to about 3 μm, a BET specific surface area of about 1 m²/g to about 10 m²/g, and a peak position degree (2θ) in the range of about 35° to about 37° and a crystallite size of about 1,000 Å to about 2,000 Å in X-ray diffraction (XRD) analysis, as calculated by Equation 1:

$$\text{Crystallite size } (D) = \frac{K\lambda}{\beta \cos \theta} \qquad \text{[Equation 1]}$$

where K is a shape factor, λ is an X-ray wavelength, β is an FWHM value (degree) of an X-ray diffraction peak, and θ is a peak position degree.

2. In Embodiment 1, the thermoplastic resin composition may include: about 100 parts by weight of a base resin including about 65 wt % to about 95 wt % of the polypropylene resin and about 5 wt % to about 35 wt % of the polyolefin copolymer resin; and about 0.5 parts by weight to about 10 parts by weight of the zinc oxide.

3. In Embodiment 1 or 2, the polyolefin copolymer resin may include at least one of an ethylene-α-olefin copolymer resin, a propylene-α-olefin copolymer resin, an epoxy-modified polyolefin copolymer resin, and a maleic anhydride-modified polyolefin copolymer resin.

4. In Embodiments 1 to 3, the polyolefin copolymer resin may be an ethylene-propylene copolymer resin.

5. In Embodiments 1 to 4, the zinc oxide may have a peak intensity ratio (B/A) of about 0.1 to about 1.0, where A denotes a peak in the wavelength range of 370 nm to 390 nm and B denotes a peak in the wavelength range of 450 nm to 600 nm in photoluminescence measurement.

6. In Embodiments 1 to 5, the thermoplastic resin composition may have an antibacterial activity of about 2 to about 7 against each of *Staphylococcus aureus* and *Escherichia coli*, as calculated according to Equation 2 after inoculation of 5 cm×5 cm specimens with *Staphylococcus aureus* and *Escherichia coli*, respectively, and culturing under conditions of 35° C. and 90% RH for 24 hours in accordance with JIS Z 2801.

$$\text{Antibacterial activity} = \log(M1/M2) \quad \text{[Equation 2]}$$

where M1 denotes the number of bacteria as measured on a blank specimen after culturing for 24 hours and M2 denotes the number of bacteria as measured on each of the specimens of the thermoplastic resin composition after culturing for 24 hours 7. In Embodiments 1 to 6, the thermoplastic resin composition may have a notched Izod impact strength of about 4 kgf·cm/cm to about 10 kgf·cm/cm, as measured on a ⅛" thick specimen in accordance with ASTM D256.

8. In Embodiments 1 to 7, the thermoplastic resin composition may have a color variation (ΔE) of about 2 to about 5, as calculated according to Equation 3 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured in the same manner as above after testing for 1,500 hours in accordance with ASTM D4459.

$$\text{Color variation}(\Delta E) = \sqrt{(\Delta L^*)^2 + (\Delta a^*)^2 + (\Delta b^*)^2} \quad \text{[Equation 3]}$$

where $\Delta L^*$ is a difference ($L_1^* - L_0^*$) between $L^*$ values before and after testing, $\Delta a^*$ is a difference ($a_1^* - a_0^*$) between $a^*$ values before and after testing, and $\Delta b^*$ is a difference ($b_1^* - b_0^*$) between $b^*$ values before and after testing.

9. In Embodiments 1 to 8, the thermoplastic resin composition may have a melt-flow index of about 13 g/10 min to about 20 g/10 min, as measured under conditions of 230° C. and 2.16 kg in accordance with ASTM D1238.

10. Another aspect of the present invention relates to a molded article. The molded article is formed of the thermoplastic resin composition according to any one of Embodiments 1 to 9.

Advantageous Effects

The present invention provides a thermoplastic resin composition which has good properties in terms of antibacterial properties, impact resistance, chemical resistance, weather resistance, fluidity, and the like.

BEST MODE

Hereinafter, exemplary embodiments of the present invention will be described in detail.

A thermoplastic resin composition according to the present invention includes: (A) a polypropylene resin; (B) a polyolefin copolymer resin; and (C) zinc oxide.

As used herein to represent a specific numerical range, "a to b" is defined as "≥a and ≤b".

(A) Polypropylene Resin

The polypropylene resin according to the present invention serves to improve chemical resistance, impact resistance, fluidity, stiffness, and the like of the thermoplastic resin composition together with the polyolefin copolymer resin, and may be selected from among polypropylene resins used in typical thermoplastic resin compositions.

In some embodiments, the polypropylene resin may have a weight average molecular weight (Mw) of about 10,000 g/mol to about 400,000 g/mol, for example, about 15,000 g/mol to about 350,000 g/mol, as measured by GPC (gel permeation chromatography). Within this range, the thermoplastic resin composition can have good mechanical strength and formability.

In some embodiments, the polypropylene resin may be present in an amount of about 65 wt % to about 95 wt %, for example, about 70 wt % to about 90 wt %, based on 100 wt % of a base resin ((A) the polypropylene resin and (B) the polyolefin copolymer resin). Within this range, the thermoplastic resin composition can have good properties in terms of chemical resistance, impact resistance, fluidity, stiffness, and the like.

(B) Polyolefin Copolymer Resin

The polyolefin copolymer resin according to the present invention serves to improve impact resistance, chemical resistance, fluidity, and the like of the thermoplastic resin composition together with the polypropylene resin, and may include at least one of, for example, an ethylene-α-olefin copolymer resin, a propylene-α-olefin copolymer resin, an epoxy-modified polyolefin copolymer resin, and a maleic anhydride-modified polyolefin copolymer resin.

In some embodiments, the polyolefin copolymer resin may be an ethylene-propylene copolymer resin, a propylene-1-butene copolymer resin, and the like.

In some embodiments, in the polyolefin copolymer resin, propylene moieties (repeat unit) may be present in an amount of about 50 wt % to about 95 wt %, for example, about 70 wt % to about 93 wt %, based on 100 wt % of the polyolefin copolymer resin. Within this range, the thermoplastic resin composition can exhibit good properties in terms of impact resistance, fluidity (molding processability), compatibility, and the like.

In some embodiments, the polyolefin copolymer resin may be used in the form of a random copolymer, a block copolymer, a multi-block copolymer, or a combination thereof.

In some embodiments, the polyolefin copolymer resin may have a weight average molecular weight (Mw) of about 10,000 g/mol to about 400,000 g/mol, for example, about 15,000 g/mol to about 350,000 g/mol, as measured by GPC. Within this range, the thermoplastic resin composition can have good mechanical strength and formability.

In some embodiments, the polyolefin copolymer resin may be present in an amount of about 5 wt % to about 35 wt %, for example, about 10 wt % to about 30 wt %, based on 100 wt % of the base resin ((A) the polypropylene resin and (B) the polyolefin copolymer resin). Within this range, the thermoplastic resin composition can have good properties in terms of impact resistance, chemical resistance, fluidity, stiffness, and the like.

(C) Zinc Oxide

The zinc oxide according to the present invention serves to improve weather resistance and antibacterial properties of the thermoplastic resin composition. The zinc oxide may have an average particle diameter (D50) of about 0.5 μm to about 3 μm, for example, about 0.7 μm to about 2.5 μm, as measured in a single particle state (not forming a secondary particle through agglomeration of particles) using a particle size analyzer (Laser Diffraction Particle Size Analyzer LS 13 320, Beckman Coulter Co., Ltd.), a BET specific surface area of about 1 m²/g to about 10 m²/g or less, for example, about 1 m²/g to about 7 m²/g, as measured by a nitrogen gas adsorption method using a BET analyzer (Surface Area and Porosity Analyzer ASAP 2020, Micromeritics Co., Ltd.), and a purity of about 99% or more. Further, the zinc oxide may have a peak position degree (2θ) in the range of about 35° to about 37° and a crystallite size of about 1,000 Å to about 2,000 Å, for example, about 1,200 Å to about 1,800 Å, in X-ray diffraction (XRD) analysis, as calculated by Scherrer's equation (Equation 1) with reference to a measured FWHM value (full width at half maximum of a diffraction peak). Within this range, the thermoplastic resin composition can have good antibacterial properties, initial color, weather resistance (discoloration resistance), and balance therebetween.

$$\text{Crystallite size } (D) = \frac{K\lambda}{\beta \cos \theta} \qquad \text{[Equation 1]}$$

where K is a shape factor, λ is an X-ray wavelength, β is an FWHM value (degree) of an X-ray diffraction peak, and θ is a peak position degree.

In some embodiments, the zinc oxide may have various shapes, for example, a spherical shape, a plate shape, a rod shape, and combinations thereof.

In some embodiments, the zinc oxide may have a peak intensity ratio (B/A) of about 0.1 to about 1.0, for example, about 0.2 to about 1.0, specifically about 0.2 to about 0.7, where A denotes a peak in the wavelength range of 370 nm to 390 nm and B denotes a peak in the wavelength range of 450 nm to 600 nm in photoluminescence measurement. Within this range, the thermoplastic resin composition can have good antibacterial properties, weather resistance, and the like.

In some embodiments, the zinc oxide may be prepared by melting metallic zinc in a reactor, heating the molten zinc to about 850° C. to about 1,000° C., for example, about 900° C. to about 950° C., to vaporize the molten zinc, injecting oxygen gas into the reactor, cooling the reactor to about 20° C. to about 30° C., and heating the reactor to about 400° C. to about 900° C., for example, 500° C. to about 800° C., for about 30 minutes to about 150 minutes, for example, for about 60 minutes to about 120 minutes.

In some embodiments, the zinc oxide may be present in an amount of about 0.5 parts by weight to about 10 parts by weight, for example, about 1 part by weight to about 5 parts by weight, relative to about 100 parts by weight of the base resin ((A) the polypropylene resin and (B) the polyolefin copolymer resin). Within this range, the thermoplastic resin composition can have good antibacterial properties, weather resistance, impact resistance, chemical resistance, fluidity, and the like.

The thermoplastic resin composition according to one embodiment of the invention may further include additives used in typical thermoplastic resin compositions. Examples of the additives may include flame retardants, fillers, antioxidants, anti-dripping agents, lubricants, release agents, nucleating agents, antistatic agents, stabilizers, pigments, dyes, and mixtures thereof, without being limited thereto. The additives may be present in an amount of about 0.001 parts by weight to about 40 parts by weight, for example, about 0.1 parts by weight to about 10 parts by weight, relative to about 100 parts by weight of the thermoplastic resin.

The thermoplastic resin composition according to one embodiment of the invention may be prepared in pellet form by mixing the aforementioned components, followed by melt extrusion in a typical twin-screw extruder at about 200° C. to about 280° C., for example, about 220° C. to about 250° C.

In some embodiments, the thermoplastic resin composition may have an antibacterial activity of about 2 to about 7 against each of *Staphylococcus aureus* and *Escherichia coli*, as calculated according to Equation 2 after inoculation of 5 cm×5 cm specimens with *Staphylococcus aureus* and *Escherichia coli*, respectively, and culturing under conditions of 35° C. and 90% RH for 24 hours in accordance with JIS Z 2801.

$$\text{Antibacterial activity} = \log(M1/M2) \qquad \text{[Equation 2]}$$

where M1 denotes the number of bacteria as measured on a blank specimen after culturing for 24 hours and M2 denotes the number of bacteria as measured on each of the specimens of the thermoplastic resin composition after culturing for 24 hours.

Here, the "blank specimen" refers to a control specimen for comparison with a test specimen (specimen of the thermoplastic resin composition). Specifically, the blank specimen is prepared by inoculating bacteria on an empty petri dish, which is suitable for checking whether the inoculated bacteria grow normally, followed by culturing for 24 hours under the same conditions as the test specimen. Antibacterial performance of the test specimen is evaluated based on comparison of the number of cultured bacteria between the blank specimen and the test specimen. Here, the "number of cultured bacteria" may be determined through a process in which each specimen is inoculated with the bacteria, followed by culturing for 24 hours, and then an inoculation solution of the bacteria is recovered and diluted, followed by growth of the bacteria into a colony on a culture dish. When population of the colony is too large to count, the number of cultured bacteria may be determined by dividing the colony into multiple sectors, measuring the population size of one sector, and converting the measured value into total population.

In some embodiments, the thermoplastic resin composition may have a notched Izod impact strength of about 4 kgf·cm/cm to about 10 kgf·cm/cm, for example, about 4.5 kgf·cm/cm to about 10 kgf·cm/cm, as measured on a ⅛" thick specimen in accordance with ASTM D256.

In some embodiments, the thermoplastic resin composition may have a color variation (ΔE) of about 2 to about 5, for example, about 2 to about 4, as calculated according to Equation 3 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured in the same manner as above after testing for 1,500 hours in accordance with ASTM D4459.

$$\text{Color variation}(\Delta E) = \sqrt{(\Delta L^*)^2 + (\Delta a^*)^2 + (\Delta b^*)^2} \qquad \text{[Equation 3]}$$

where ΔL* is a difference ($L_1^* - L_0^*$) between L* values before and after testing, Δa* is a difference ($a_1^* - a_0^*$) between a* values before and after testing, and Δb* is a difference ($b_1^* - b_0^*$) between b* values before and after testing.

In some embodiments, the thermoplastic resin composition may have a melt-flow index of about 13 g/10 min to about 20 g/10 min, for example, about 14 g/10 min to about 19 g/10 min, as measured under conditions of 230° C. and 2.16 kg in accordance with ASTM D1238.

A molded article according to the present invention is formed of the thermoplastic resin composition set forth above. The antibacterial thermoplastic resin composition may be prepared in pellet form. The prepared pellets may be produced into various molded articles (products) by various molding methods such as injection molding, extrusion, vacuum molding, and casting. These molding methods are well known to those skilled in the art. The molded article according to the present invention has good antibacterial properties, impact resistance, chemical resistance, weather resistance, fluidity (molding processability), and balance therebetween and thus is useful as materials for antibacterial products, external components, and the like, which are frequently exposed to body contact.

MODE FOR INVENTION

Next, the present invention will be described in more detail with reference to some examples. It should be understood that these examples are provided for illustration only and are not to be in any way construed as limiting the present invention.

EXAMPLE

Details of components used in Examples and Comparative Examples are as follows:

(A) Propylene Resin

A polypropylene resin (Manufacturer: Lotte Chemical Co., Ltd., Product Name: H1500, Melt flow index (MI): 12 g/10 min) was used.

(B) Polyolefin Copolymer Resin

An ethylene-propylene copolymer resin (Manufacturer: Lotte Chemical Co., Ltd., Product Name: JH-370A, Melt flow index (MI): 27 g/10 min) was used.

(C) Zinc Oxide (C1) Metallic zinc was melted in a reactor, followed by heating to 900° C. to vaporize the molten zinc, and then oxygen gas was injected into the reactor, followed by cooling to room temperature (25° C.) to obtain an intermediate. Then, the intermediate was subjected to heat treatment at 700° C. for 90 minutes, followed by cooling to room temperature (25° C.), thereby preparing zinc oxide.

(C2) Zinc oxide (Manufacturer: Ristecbiz Co., Ltd., product name: RZ-950) was used.

For the prepared zinc oxides (C1 and C2), average particle diameter, BET surface area, purity, peak intensity ratio (B/A) of peak B in the wavelength range of 450 nm to 600 nm to peak A in the wavelength range of 370 nm to 390 nm in photoluminescence measurement, and crystallite size were measured. Results are shown in Table 1.

TABLE 1

|  | (C1) Zinc oxide | (C2) Zinc oxide |
| --- | --- | --- |
| Average particle diameter (μm) | 1.2 | 1.1 |
| BET surface area (m$^2$/g) | 4 | 15 |
| Purity (%) | 99 | 97 |
| PL peak intensity ratio (B/A) | 0.28 | 9.8 |
| Crystallite size (Å) | 1417 | 503 |

Property Evaluation (1) Average particle diameter (unit: μm): Average particle diameter (volume average) was measured using a particle size analyzer (Laser Diffraction Particle Size Analyzer LS I3 320, Beckman Coulter Co., Ltd.).

(2) BET surface area (unit: m$^2$/g): BET surface area was measured by a nitrogen gas adsorption method using a BET analyzer (Surface Area and Porosity Analyzer ASAP 2020, Micromeritics Co., Ltd.).

(3) Purity (unit: %): Purity was measured by thermogravimetric analysis (TGA) based on the weight of remaining material at 800° C.

(4) PL peak intensity ratio (B/A): Spectrum emitted upon irradiation of a specimen using a He—Cd laser (KIMMON, 30 mW) at a wavelength of 325 nm at room temperature was detected by a CCD detector in a photoluminescence measurement method, in which the CCD detector was maintained at −70° C. A peak intensity ratio (B/A) of peak B in the wavelength range of 450 nm to 600 nm to peak A in the wavelength range of 370 nm to 390 nm was measured. Here, an injection molded specimen was irradiated with laser beams without separate treatment upon PL analysis, and zinc oxide powder was compressed in a pelletizer having a diameter of 6 mm to prepare a flat specimen.

(5) Crystallite size (unit: Å): Crystallite size was measured using a high-resolution X-ray diffractometer (PRO-MRD, X'pert Inc.) at a peak position degree (2θ) in the range of 35° to 37° and calculated by Scherrer's equation (Equation 1) with reference to a measured FWHM value (full width at half maximum of a diffraction peak). Here, both a powder form and an injection molded specimen could be measured. For more accurate analysis, the injection molded specimen was subjected to heat treatment in air at 600° C. for 2 hours to remove a polymer resin therefrom before XRD analysis.

$$\text{Crystallite size } (D) = \frac{K\lambda}{\beta \cos \theta} \quad \text{[Equation 1]}$$

where K is a shape factor, λ is an X-ray wavelength, β is an FWHM value (degree) of an X-ray diffraction peak, and θ is a peak position degree.

Examples 1 to 4 and Comparative Examples 1 to 4

The aforementioned components were mixed in amounts as listed in Table 2, followed by extrusion at 230° C., thereby preparing a thermoplastic resin composition in pellet form. Here, extrusion was performed using a twin-screw extruder (L/D: 36, Φ: 45 mm). The prepared pellets were dried at 80° C. for 4 hours or more and then subjected to injection molding using a 6 oz. injection machine (molding temperature: 230° C., mold temperature: 60° C.), thereby preparing a specimen. The prepared specimen was evaluated as to the following properties. Results are shown in Table 2.

Property Evaluation (1) Antibacterial activity: In accordance with JIS Z 2801, 5 cm×5 cm specimens were inoculated with *Staphylococcus aureus* and *Escherichia coli*, respectively, and subjected to culturing under conditions of 35° C. and 90% RH for 24 hours, followed by calculation of antibacterial activity according to Equation 2.

$$\text{Antibacterial activity} = \log(M1/M2) \quad \text{[Equation 2]}$$

where M1 denotes the number of bacteria as measured on a blank specimen after culturing for 24 hours and M2 denotes the number of bacteria as measured on each of the specimens after culturing for 24 hours.

(2) Impact resistance (Notched Izod impact strength (unit: kgf·cm/cm)): Notched Izod impact strength was measured on a ⅛" thick specimen in accordance with ASTM D256.

(3) Weather resistance (color variation (ΔE)): For determination of color variation, initial color values ($L_0^*$, $a_0^*$, $b_0^*$) were measured on an injection molded specimen having a size of 50 mm×90 mm×3 mm using a colorimeter (KONICA MINOLTA CM-3700A), followed by testing for 1,500 hours in accordance with ASTM D4459, and color values ($L_1^*$, $a_1^*$, $b_1^*$) of the specimen were measured in the same manner as above. Thereafter, color variation (ΔE) was calculated according to Equation 2:

$$\text{Color variation}(\Delta E) = \sqrt{(\Delta L^*)^2 + (\Delta a^*)^2 + (\Delta b^*)^2} \quad \text{[Equation 3]}$$

where ΔL* is a difference ($L_1^*-L_0^*$) between L* values before and after testing, Δa* is a difference ($a_1^*-a_0^*$) between a* values before and after testing, and Δb* is a difference ($b_1^*-b_0^*$) between b* values before and after testing.

(4) Fluidity: Melt-flow index (MI, unit: g/10 min) was measured under conditions of 230° C. and 2.16 kg in accordance with ASTM D1238.

TABLE 2

|  | Example | | | | Comparative Example | | | |
| --- | --- | --- | --- | --- | --- | --- | --- | --- |
|  | 1 | 2 | 3 | 4 | 1 | 2 | 3 | 4 |
| (A) (wt %) | 70 | 80 | 90 | 80 | 80 | 80 | 100 | — |
| (B) (wt %) | 30 | 20 | 10 | 20 | 20 | 20 | — | 100 |
| (C1) (parts by weight) | 4 | 4 | 4 | 2 | — | — | 4 | — |
| (C2) (parts by weight) | — | — | — | — | 4 | 2 | — | 4 |
| Antibacterial activity (*Escherichia coli*) | 4.6 | 4.6 | 4.6 | 3.5 | 1.5 | 1.4 | 4.6 | 1.0 |
| Antibacterial activity (*Staphylococcus aureus*) | 6.2 | 6.2 | 6.2 | 5.0 | 1.0 | 1.2 | 6.2 | 1.7 |
| Impact resistance | 5.5 | 5.0 | 4.5 | 5.0 | 5.2 | 5.0 | 3.0 | 6.0 |
| Color variation (ΔE) | 3.0 | 2.8 | 3.1 | 3.7 | 7.5 | 8.0 | 2.9 | 7.8 |
| Fluidity | 14 | 16 | 18 | 16 | 15 | 16 | 10 | 24 |

* Parts by weight: relative to 100 parts by weight of a base resin (A + B).

From Table 2, it could be seen that the thermoplastic resin composition according to the present invention had good properties in terms of antibacterial properties (antibacterial activity), impact resistance (notched Izod impact strength), weather resistance (color variation (ΔE)), and fluidity (MI).

Conversely, it could be seen that the resin compositions of Comparative Examples 1 and 2 prepared using the zinc oxide (C2), the BET specific surface area and the crystallite size of which were not within the ranges according to the present invention, instead of using the zinc oxide (C1) according to the present invention, exhibited deterioration in weather resistance and antibacterial properties; the resin composition of Comparative Example 3 prepared using the polypropylene resin alone as the base resin exhibited deterioration in fluidity and impact resistance; and the resin composition of Comparative Example 4 prepared using the ethylene-propylene copolymer resin alone as the base resin exhibited deterioration in weather resistance.

It should be understood that various modifications, changes, alterations, and equivalent embodiments can be made by those skilled in the art without departing from the spirit and scope of the invention.

The invention claimed is:

1. A thermoplastic resin composition comprising:
   about 100 parts by weight of a base resin comprising about 65 wt % to about 95 wt % of a polypropylene resin and about 5 wt % to about 35 wt % of a polyolefin copolymer resin, wherein the polyolefin copolymer resin comprises an ethylene-α-olefin copolymer resin, a propylene-α-olefin copolymer resin, an epoxy-modified polyolefin copolymer resin, and/or a maleic anhydride-modified polyolefin copolymer resin; and
   about 0.5 parts by weight to about 10 parts by weight of zinc oxide based on about 100 parts by weight of the base resin,
   wherein the zinc oxide has an average particle diameter of about 0.5 μm to about 3 μm, a BET specific surface area of about 1 m²/g to about 10 m²/g, and a peak position degree (2θ) in the range of about 35° to about 37° and a crystallite size of about 1,000 Å to about 2,000 Å in X-ray diffraction (XRD) analysis, as calculated by Equation 1:

$$\text{Crystallite size } (D) = \frac{K\lambda}{\beta \cos \theta} \quad \text{[Equation 1]}$$

where K is a shape factor, λ, is an X-ray wavelength, β is an FWHM value (degree) of an X-ray diffraction peak, and θ is a peak position degree.

2. The thermoplastic resin composition according to claim 1, wherein the polyolefin copolymer resin is an ethylene-propylene copolymer resin.

3. The thermoplastic resin composition according to claim 1, wherein the zinc oxide has a peak intensity ratio (B/A) of about 0.1 to about 1.0, where A denotes a peak in the wavelength range of 370 nm to 390 nm and B denotes a peak in the wavelength range of 450 nm to 600 nm in photoluminescence measurement.

4. The thermoplastic resin composition according to claim 1, wherein the thermoplastic resin composition has an antibacterial activity of about 2 to about 7 against each of *Staphylococcus aureus* and *Escherichia coli*, as calculated according to Equation 3 after inoculation of 5 cm×5 cm specimens with *Staphylococcus aureus* and *Escherichia coli*, respectively, and culturing under conditions of 35° C. and 90% RH for 24 hours in accordance with JIS Z 2801:

$$\text{Antibacterial activity} = \log(M1/M2) \quad \text{[Equation 2]}$$

where M1 denotes the number of bacteria as measured on a blank specimen after culturing for 24 hours and M2 denotes the number of bacteria as measured on each of the specimens of the thermoplastic resin composition after culturing for 24 hours.

5. The thermoplastic resin composition according to claim 1, wherein the thermoplastic resin composition has a notched Izod impact strength of about 4 kgf·cm/cm to about 10 kgf·cm/cm, as measured on a ⅛" thick specimen in accordance with ASTM D256.

6. The thermoplastic resin composition according to claim 1, wherein the thermoplastic resin composition has a color variation (4E) of about 0.1 to about 2.0, as calculated according to Equation 2 based on initial color values ($L_{0*}$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured in the same manner as above after testing for 1,500 hours in accordance with ASTM D4459:

$$\text{Color variation}(\Delta E) = \sqrt{(\Delta L^*)^2 + (\Delta a^*)^2 + (\Delta b^*)^2} \quad \text{[Equation 2]}$$

where ΔL* is a difference ($L_1^*-L_0^*$) between L* values before and after testing, Δa* is a difference ($a_1^*-a_0^*$) between a* values before and after testing, and Δb* is a difference ($b_1^*-b_0^*$) between b* values before and after testing.

7. The thermoplastic resin composition according to claim 1, wherein the thermoplastic resin composition has a melt-flow index of about 13 g/10 min to about 20 g/10 min, as measured under conditions of 230° C. and 2.16 kg in accordance with ASTM D1238.

8. A molded article formed of the thermoplastic resin composition according to claim 1.

* * * * *